United States Patent
White

(10) Patent No.: US 10,203,001 B2
(45) Date of Patent: Feb. 12, 2019

(54) SUCTION CUP AND BRACKET AND METHOD

(71) Applicant: K-International, Inc., Waukegan, IL (US)

(72) Inventor: Michael J. White, Ripon, WI (US)

(73) Assignee: K-International, Inc., Waukegan, IL (US)

( * ) Notice: Subject to any disclaimer, the term of this patent is extended or adjusted under 35 U.S.C. 154(b) by 0 days.

(21) Appl. No.: 15/651,833

(22) Filed: Jul. 17, 2017

(65) Prior Publication Data
US 2019/0017536 A1  Jan. 17, 2019

(51) Int. Cl.
*F16B 47/00* (2006.01)
*F16M 13/02* (2006.01)

(52) U.S. Cl.
CPC ........... *F16B 47/00* (2013.01); *F16M 13/022* (2013.01)

(58) Field of Classification Search
USPC ...................................................... 248/205.5
See application file for complete search history.

(56) References Cited

U.S. PATENT DOCUMENTS

| | | | | |
|---|---|---|---|---|
| 2,171,875 A * | 9/1939 | Holden | ............... | F16B 47/00 248/206.1 |
| 4,279,396 A * | 7/1981 | Bendock | ............... | A47K 3/38 24/530 |
| 4,648,572 A * | 3/1987 | Sokol | ............... | B60R 11/02 248/205.2 |
| 4,867,402 A * | 9/1989 | Benson | ............... | A47G 29/08 248/206.3 |
| 5,028,026 A * | 7/1991 | Philipps | ............... | A47G 7/044 248/206.1 |
| 5,110,078 A * | 5/1992 | Gary | ............... | F21V 19/0005 248/206.2 |
| 5,595,364 A * | 1/1997 | Protz, Jr. | ............... | A47G 1/17 248/205.5 |
| 5,893,543 A * | 4/1999 | Emery | ............... | A47K 1/09 248/205.5 |
| 6,131,865 A * | 10/2000 | Adams | ............... | A47G 1/17 248/205.5 |
| 6,237,885 B1 * | 5/2001 | Mitchell | ............... | A47H 3/02 248/205.1 |
| 6,330,948 B1 * | 12/2001 | Leto | ............... | A47J 47/20 211/65 |
| 6,886,792 B2 * | 5/2005 | Immerman | ............... | F16B 47/00 211/106 |
| 7,163,182 B2 * | 1/2007 | Lee | ............... | F16B 47/00 248/205.5 |
| 8,333,353 B1 * | 12/2012 | Silverman | ............... | F16M 11/041 24/331 |
| 8,584,997 B2 * | 11/2013 | Hajianpour | ............... | F16B 47/00 248/205.5 |
| 8,662,463 B2 * | 3/2014 | Chen | ............... | F16B 47/00 211/60.1 |

(Continued)

*Primary Examiner* — Monica E Millner
(74) *Attorney, Agent, or Firm* — Schiff Hardin LLP

(57) ABSTRACT

A suction cup includes a flexible cup, a stem connected to the flexible cup, and a connector connected to the stem, wherein the stem is of a square, rectangular or other shape in cross section. A bracket may be provided having a recess configured to fit onto the stem such that the suction cup and the bracket are prevented from rotating relative to one another. A method for preventing rotation between the suction cup and the bracket is provided.

5 Claims, 3 Drawing Sheets

(56) References Cited

U.S. PATENT DOCUMENTS

| | | | |
|---|---|---|---|
| 8,944,007 B2* | 2/2015 | Bagnall | A01K 61/85 |
| | | | 119/53 |
| 9,873,285 B2* | 1/2018 | Silva Rubio | B43K 23/001 |
| 2004/0099775 A1* | 5/2004 | Zheng | B60R 11/02 |
| | | | 248/206.3 |
| 2005/0236538 A1* | 10/2005 | Schmidt | A47K 1/09 |
| | | | 248/205.5 |
| 2007/0221801 A1* | 9/2007 | Jensen | F16B 45/00 |
| | | | 248/206.2 |
| 2011/0214258 A1* | 9/2011 | Seymour | B65H 75/18 |
| | | | 24/115 F |
| 2012/0273635 A1* | 11/2012 | Byler | B64D 9/003 |
| | | | 248/205.5 |
| 2016/0275828 A1* | 9/2016 | White | G09F 7/18 |

* cited by examiner

SUCTION CUP AND BRACKET AND METHOD

BACKGROUND OF THE INVENTION

Field of the Invention

The present invention relates generally to a method and apparatus for fastening an object to a surface, and more particularly to a suction cup and bracket and method.

Description of the Related Art

Suction cups are used to fasten objects to a smooth surface such as glass, tile, stone, metal, counters, panels, and the like. Suction cups may have a tab extending from the edge of the suction cup by which the suction cup may be released from the surface. It may be desirable to maintain the release tab in a predetermined orientation. Objects are usually fastened to suction cups or rather suction cups are usually fastened to objects for attachment to the smooth surface. It may be desirable to maintain the object in a predetermined orientation after fastening the object to a surface using a suction cup.

SUMMARY OF THE INVENTION

The present invention provides a suction cup, a suction cup and bracket, and a method for fastening to a surface. The suction cup includes a flexible cup portion, a release tab, a stem, and a connector. The connector is used to fasten the suction cup to an object to be attached to a surface. The stem of certain embodiments is square, rectangular or of other shape. A bracket or other device into which the stem fits is shaped to accommodate the square, rectangular or other stem and maintain an orientation between the suction cup and the bracket or other device. A predetermined orientation between the release tab and the object being mounted by the suction is maintained. An orientation of the object mounted by the suction cup is maintained.

DETAILED DESCRIPTION OF THE PREFERRED EMBODIMENTS

Figure 1:
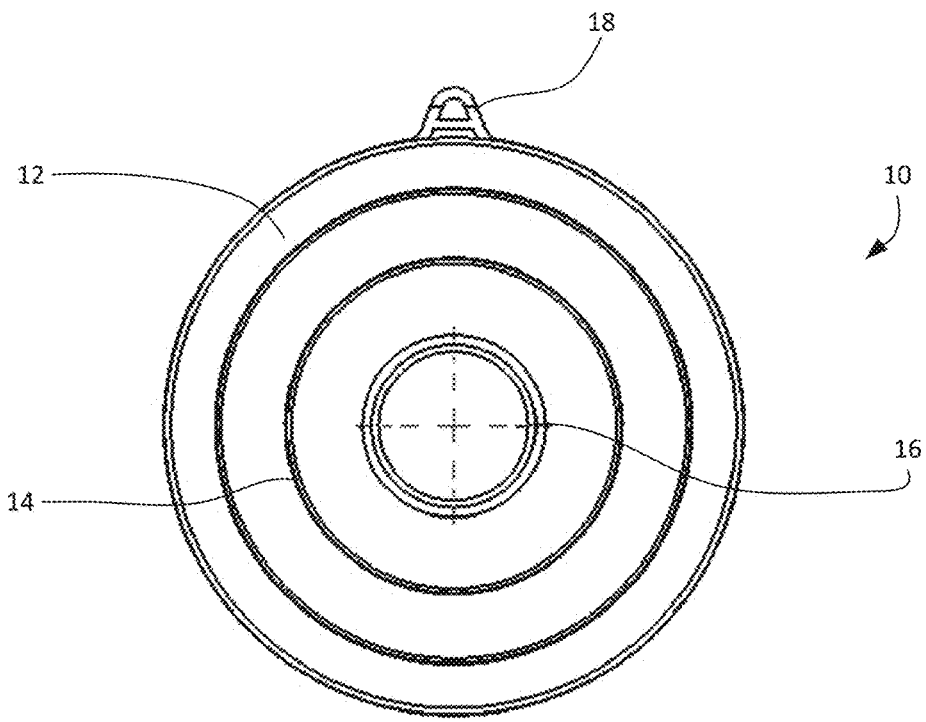
FIG. 1 is a top plan view of a suction cup according to the present invention.

In FIG. 1, a suction cup 10 includes a flexible cup 12 that is generally cone shaped. Concentric ridges 14 are provided in the illustrated embodiment, although the ridges are not required in every embodiment. A connector 16 is provided at the center of the suction cup 10 by which the suction cup may be fastened to an object. A release tab 18 extends from an edge of the flexible cup 12 by which the suction or vacuum created by pressing the flexible cup 12 against a smooth surface may be released to release the suction cup from the surface. The suction cup 10 is formed of a flexible material such as rubber or the like.

Figure 2:
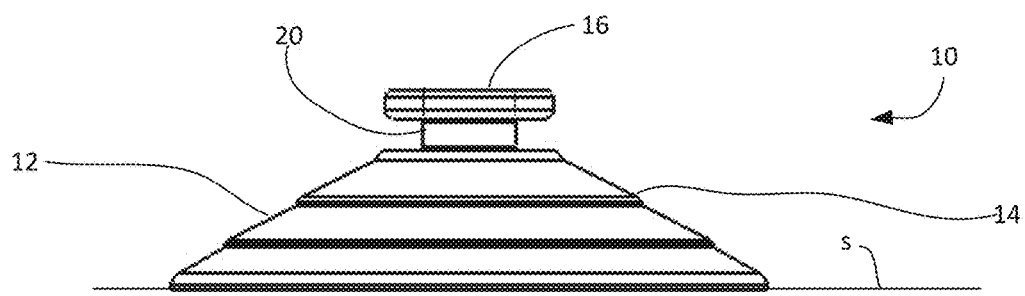
FIG. 2 is a side elevational view of the suction cup of FIG. 1.

In FIG. 2, the suction cup 10 includes the cone-shaped flexible cup 12, which is deformed by pressing against a surface to generate a vacuum between the flexible cup 12 and the surface for holding the suction cup to the surface. The ridges 14 may define steps or rings of differing thickness to control the flex of the flexible cup and reinforce the flexible cup 12 for maintaining the suction cup 12 in the attached condition. The connector 16 of certain embodiments is a round button-shaped connector. Other shapes and types of connectors may be provided, including a threaded shaft or screw. The connector 16 is connected to the flexible cup 12 by a stem 20. The stem 20 extends for a distance between the connector 16 and the flexible cup 12 which defines a gap between the connector 16 and the flexible cup 12. A bracket or other element may be inserted into the gap to attach the suction cup 10 to an object. The suction cup 10 may be attached to any object.

As is well understood by those of skill in the art, the suction cup 10 is pressed onto a smooth surface S as shown in FIG. 2 so that the flexible cup 12 flattens. The volume of air between the flexible cup 12 and the surface is decreased. The flexible cup 12 is biased to return to the cone shape as shown, which creates a low pressure or partial vacuum between the surface S and the flexible cup 12. The flexible cup 12 provides an air tight seal against the surface S. The atmospheric pressure of the ambient air provides the force that maintains the suction cup 10 in place, holding the suction cup to the surface S.

Figure 3:
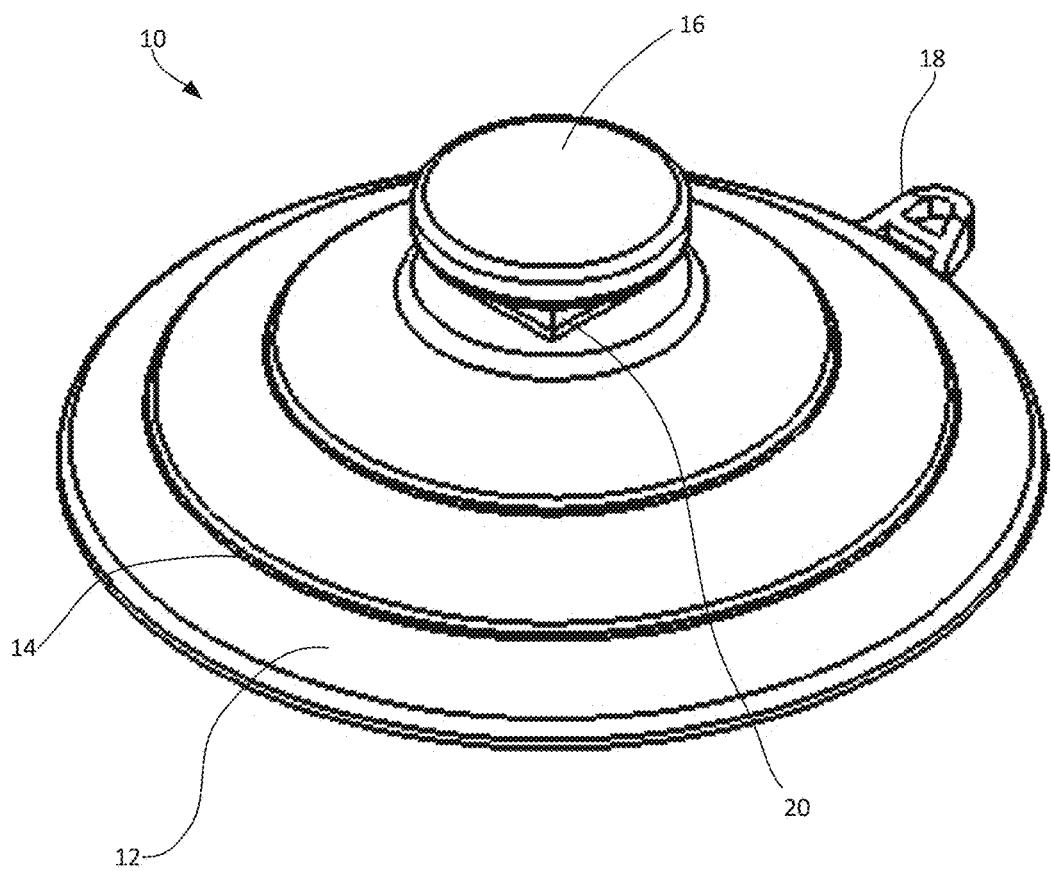
FIG. 3 is a perspective view of the suction cup of FIG. 1.

FIG. 3 shows the suction cup 10 with the release round tab 18 extending from an edge of the flexible cup 12. The connector 16 is a disc-shaped or button-shaped connector disposed at the center of the flexible cup 12. The stem 20 that connects the connector 16 to the flexible cup 12 is square or rectangular in the illustrated embodiment. The stem 20 is shaped and configured to prevent rotation of the suction cup 10 in a bracket or other holder. The suction cup 10 and in particular the release tab 18 may be positioned in a particular orientation and that orientation is maintained without the possibility that the suction cup 10 and release tab 18 may become rotated to a different orientation. The user may be assured that the release tab 18 remains in the desired orientation. An object attached to the suction cup 10 by the stem 20 may be maintained in a desired orientation and is prevented from rotating on the suction cup 10 by the shaped stem 20. In certain embodiments, the stem 20 is square or rectangular in cross section. Other stem shapes are possible and within the scope of this invention with the only exception being round or cylindrical in shape.

Figure 4:
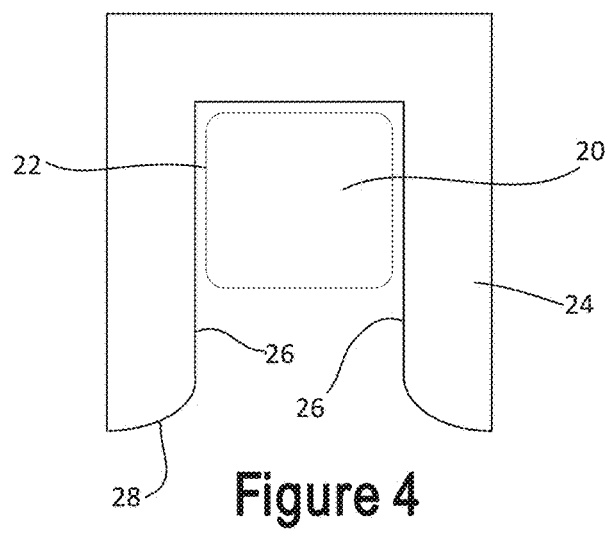
FIG. 4 is a cross-sectional view through the stem of the suction cup showing the suction cup mounted on a bracket.
Figure 5:
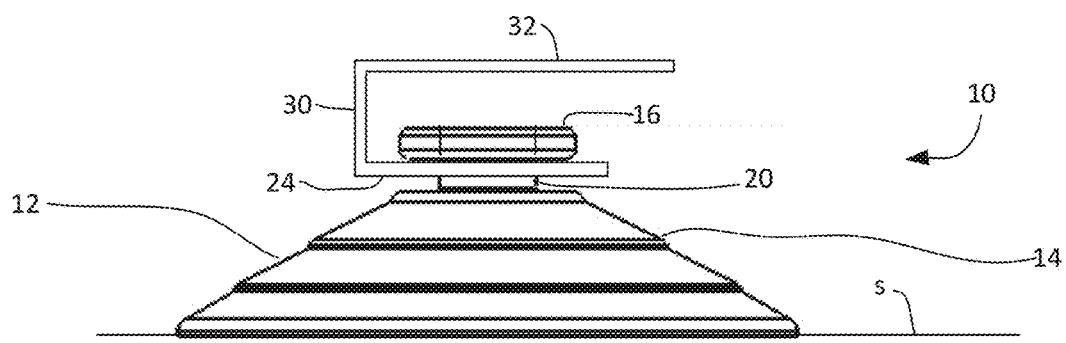
FIG. 5 is a side elevational view of the suction cup of FIG. 1 on which is mounted a bracket.

In FIG. 4, a cross section through the stem 20 is shown. The stem 20 of the illustrated embodiment is square in cross section with four flat sides 22. The corners connecting the sides 22 may be slightly rounded as shown or may be sharp corners, as desired or other shapes with the only exception being round or cylindrical in shape. A bracket 24 is fitted onto the suction cup 10 by sliding the bracket 24 onto the stem 20. Only a portion of the bracket 24 is shown. For example, the upper edge of the bracket 24 may extend out of the plane of this cross-sectional view, for example as shown in FIG. 5 by portion 30, to a portion that connects to an object to be mounted using the suction cup 10. The bracket 24 may be a bracket of an object to be mounted on the suction cup 10 or may be a separate bracket that connects the suction cup 10 to an object. The bracket 24 has inside edges 26 that are flat and spaced apart by slightly more than the width of the stem 20 at the flat sides 22. The flat sides 22 of the square stem 20 prevent the suction cup 10 from rotating in the bracket 24 by contact between the flat sides 22 and the inside edges 26.

The stem 20 may be shaped and sized to prevent rotation in a bracket 24 of a predetermined size and shape. The bracket 24 may be shaped and sized to prevent rotation of a stem 20 of predetermined size and shape. Alternative shapes of brackets 24 and stems 20 and/or connectors 16 that prevent rotation of the suction cup 10 relative to the bracket 24 are contemplated and within the scope of this invention.

The suction cup 10 may be positioned with the release tab 18 at a preferred orientation when the suction cup 10 is inserted into the bracket 24. That orientation is maintained without the chance that the suction cup 10 may rotate. For example, the release tab 18 may be oriented at a convenient position for release of the suction cup 10 from a surface. If a suction cup having a round or cylindrical stem were used, the suction cup may become rotated to a position where the release tab 18 is blocked by the object being held or at least in a less convenient position. Alternatively, the release tab 18 may be positioned so that it is not readily accessible to release the suction cup 10, for example by being blocked by the object. An advertent release of the suction cup 10, for example by a child, may be prevented by positioning of the release tab and maintaining the predetermined orientation of the suction cup.

The bracket 24 and the object that is connected to the bracket for holding by the suction cup 10 is prevented from being rotated while attached to the smooth surface. A display or sign, for example, is prevented from being rotated when attached by the suction cup 10.

The bracket 24 includes tapered ends 28 to facilitate fastening of the suction cup 10 in the bracket 24 or alternatively fastening the bracket 24 onto the suction cup 10. The tapered ends 28 provide easy access to the opening between the edges 26.

In the method, the suction cup 10 is prevented from rotating relative to the bracket 24 by the relative shapes and sizes of the bracket opening and the stem 20. The stem 20 is square shaped and of a size to fit into the opening in the bracket without rotating.

FIG. 5 shows an example of the bracket 24 in side view including the portion having the edges 26 that engage the stem 20, a transverse portion 30, and a parallel portion 32 that connects to an object to be mounted using the suction cup 10. The portion 24 with the edges 26 is fitted onto the stem 20 with the parallel portion 32 spaced from the portion 24 by a distance to accommodate the connecting portion 16. Other shapes brackets are possible and within the scope of this invention.

Although other modifications and changes may be suggested by those skilled in the art, it is the intention of the inventors to embody within the patent warranted hereon all changes and modifications as reasonably and properly come within the scope of their contribution to the art.

I claim:

1. A suction cup, comprising:
   a flexible cup;
   a release tab extending from the flexible cup at a predetermined position;
   a stem connected to the flexible cup, the stem extending from the flexible cup in a longitudinal direction; the stem being of a square or rectangular shape in cross section transverse to the longitudinal direction, the stem having two parallel sides, the two parallel sides defining two parallel planes;
   the release tab being disposed between extensions of the two parallel planes of the two parallel sides when the parallel planes are extended toward the release tab generally in a transverse direction from the stem;
   a connector connected to the stem; and
   a bracket having a square or rectangular recess configured to fit onto the square or rectangular shape of the stem of the flexible cup such that the release tab is maintained in a predetermined position relative to the bracket while the stem is in the recess of the bracket.

2. A method for maintaining a predetermined position of a release tab of a suction cup relative to a bracket, comprising:
   aligning the release tab of the suction cup in a first predetermined orientation;
   aligning the bracket in a second predetermined orientation relative to the first predetermined orientation of the release tab;
   joining the suction cup in the first predetermined orientation to the bracket in the second predetermined orientation by inserting a rectangular stem of the suction cup into a recess in the bracket, the rectangular stem having a rectangular shape in cross section transverse to an axis of the rectangular stem, the rectangular stem having two parallel sides, the release tab being disposed between extensions of planes defined by the two parallel sides, the recess of the bracket and rectangular cross section of the rectangular stem being sized and shaped to prevent rotation of the suction cup relative to the bracket, the release tab of the suction cup being maintained at the predetermined orientation relative to the bracket by the rectangular stem of the suction cup in the recess in the bracket.

3. A method as claimed in claim 2, wherein the rectangular stem is a square stem in transverse cross section to the axis of the stem, the square stem defining two pairs of parallel sides, the release tab being disposed between extensions of planes of one pair of the parallel sides.

4. A suction cup as claimed in claim 1, wherein the flexible cup is configured to attach to a surface, the flexible cup defining an attachment plane when attached to the surface;
   wherein the stem extends perpendicular to the attachment plane; and
   wherein the cross section of the stem having the square or rectangular shape is parallel to the attachment plane.

5. A suction cup as claimed in claim 1, wherein the release tab extends from the perimeter of the flexible cup, and wherein the square or rectangular shape in cross section stem is oriented so that the extensions of the two parallel planes defined by the two parallel sides in a direction toward the perimeter of the flexible cub are disposed in either side of the release tab.

* * * * *